June 26, 1951  F. ERNST  2,558,426
PISTON RING
Filed July 22, 1946
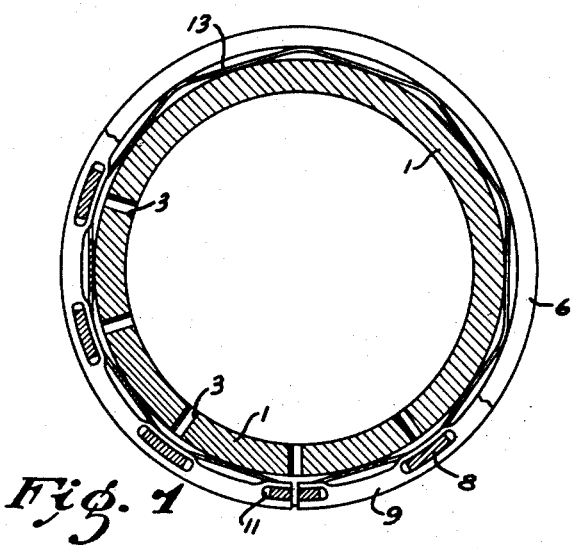
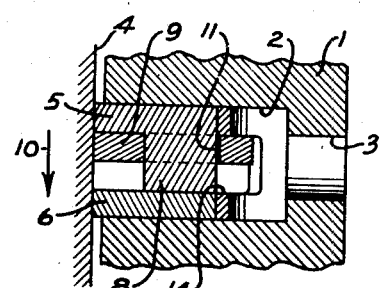
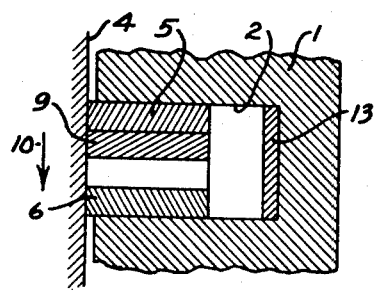
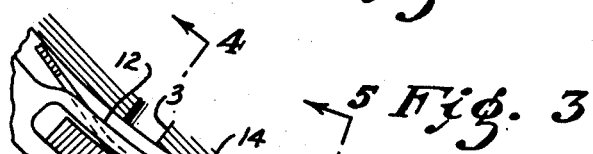
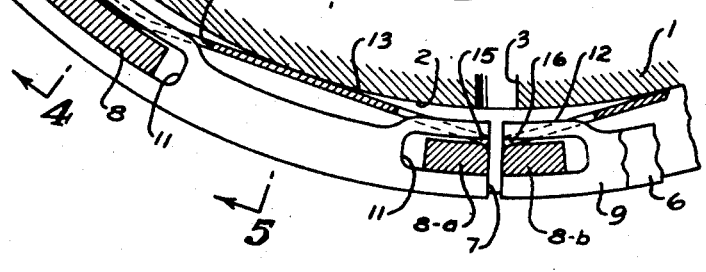
INVENTOR
Fred Ernst
BY John Flann
ATTORNEY Patented June 26, 1951

2,558,426

UNITED STATES PATENT OFFICE 2,558,426

PISTON RING

Fred Ernst, Gardena, Calif., assignor to
Guy H. Hall, Los Angeles, Calif.

Application July 22, 1946, Serial No. 685,551

11 Claims. (Cl. 309—45)

This invention relates to piston rings, and especially to rings of the general character shown in an application filed in the name of Fred Ernst on April 30, 1946, entitled "Piston Ring," and having Serial No. 666,095, now abandoned.

Such rings are capable of use with pistons of internal combustion engines to seal the cylinder chamber by resiliently contacting the cylinder walls. They may also be provided with apertures, communicating with apertures in the piston, to facilitate the return of oil from the cylinder walls to the interior of the piston and thence to the crank case.

Whether used as a compression ring or an oil ring, the conditions of service usually give rise to carbon accretion on the ring surfaces. Such accretion, when the ring is used as an oil ring, may clog or obstruct the oil apertures.

In the prior application hereinabove referred to, as well as in Patent No. 2,400,109, issued May 14, 1946, there is disclosed a ring incorporating an auxiliary ring that has the effect of inhibiting the formation of carbon, as well as other advantages. The auxiliary ring is urged resiliently against the cylinder wall, and has a limited relative axial movement with respect to the main ring. The resultant pounding and scraping action facilitates the flow of the oil, and eliminates the injurious deposition of carbon.

It is one of the objects of this invention to improve, in general, piston rings of this character.

Rings of this type are intended to remain in operation over long periods without attention. It is another object of this invention to provide a ring that ensures against any possibility of displacement of the auxiliary ring from its proper operating position, even after considerable wear, or if the auxiliary ring should break into several pieces. In this way, scoring, or other serious injury in the cylinder or piston is entirely obviated.

This invention possesses many other advantages, and has other objects which may be made more clearly apparent from a consideration of one embodiment of the invention. For this purpose there is shown a form in the drawings accompanying and forming part of the present specification. The form will now be described in detail illustrating the general principles of the invention; but it is to be understood that this detailed description is not to be taken in a limiting sense, since the scope of this invention is best defined by the appended claims.

Referring to the drawings:

Figure 1 is a cross-section of a piston, utilizing a ring that incorporates the invention;

Fig. 2 is an enlarged fragmentary side view, partly broken away, of the ring illustrated in Fig. 1;

Fig. 3 is a fragmentary, sectional view, taken along a plane indicated by the line 3—3 of Fig. 2; and Figs. 4 and 5 are enlarged sectional views, taken along planes represented respectively by the lines 4—4 and 5—5 of Fig. 3.

As shown most clearly in Fig. 1, the piston has a hollow wall 1 that may correspond to the skirt of the piston. Usually, the piston is provided with a plurality of spaced piston ring grooves. Some of the grooves are used to accommodate oil rings, and others to accommodate pressure rings. One such groove 2 is illustrated in this instance, adapted to accommodate an oil ring. However, the ring structure could obviously be used as a pressure ring.

Oil apertures 3 are formed radially of the piston and connect the groove 2 with the interior of the piston. These ports or apertures 3, as is well understood, serve to pass oil or other lubricant from the wall 4 of the cylinder to the interior of the piston, and thence to the crank case.

The piston ring structure includes a main ring 5. The upper surface of this ring 5 is intended to be seated against the upper surface of the groove 2. A second ring 6 is disposed against the bottom of the groove 2, and may be in the form of a flat annulus. Both of these rings 5 and 6 may be split, as indicated by reference character 7 in Figs. 2 and 3. Preferably, the main ring 5 is made of cast iron, and the lower or rail ring 6 is preferably formed of steel.

The combined width of rings 5 and 6 is substantially less than the width of the groove 2. These rings are kept in spaced relation by one or more projections or members 8, shown in this instance as formed integrally with the cast iron ring 5, and extending downwardly therefrom. These projections occur in regular spaced relation, preferably opposite each of the ports 3.

In the space formed between the rings 5 and 6, an auxiliary or floater ring 9 is provided. This auxiliary or floater ring has a width substantially less than the space between rings 5 and 6, so that substantial movement of ring 9 in a direction axially of the piston may occur. Ring 9 may also be split.

Thus, for example, while the piston is moving downwardly, as indicated by the arrows 10 in Figs. 4 and 5, the floater ring 9 is seated against the lower side of the main ring 5. Upon reversal of the piston movement, however, the floater ring 9 is caused to contact the top surface of the rail ring 6. The scraping and pounding action produced by the auxiliary ring ensures against appreciable carbon accretion on the ring surfaces. Furthermore, this movement ensures that the oil will be properly circulated through the ports or openings 3.

In order to permit the projections 8 to extend downwardly to the ring 6, the auxiliary ring 9 is provided with appropriate slots 11 through which these projections extend. As shown most clearly in Fig. 3, the auxiliary ring 9 is widened at the places 12 to accommodate the width of the slots 11. These slots have a width only slightly greater than the width of the projections 8, so that as main ring 5 expands, the expansion also serves to expand ring 9. However, it is not essential to expand the ring 9 to the extent that it contacts the wall 4. The function of the ring to eliminate carbon accretion and facilitate the flow of it is accomplished even when there is a slight clearance between the ring 9 and wall 4.

The extensions 8 and the slots 11 form a lock preventing substantial outward radial movement of the ring 9 with respect to the main ring 5. In this way, although the ring 9 may be subjected to considerable wear, and although the ring may be broken, the danger of injurious displacement of the ring 9 out of the groove 2 is prevented. Since there are a number of these extensions, even small pieces of the ring would be retained against injurious displacement.

Although all three of the rings 5, 9, and 6 may be sufficiently resilient to cause them to be urged resiliently into contact with the cylinder wall 4, preferably an expander ring 13 is used to supplement the normal resiliency of the rings. This expander, as shown most clearly in Fig. 3, is formed of flat resilient material bent to the polygonal configuration illustrated in Fig. 1 and disposed in the back portion of groove 2. Contact of the expander ring 13 with the ring structure is limited to the corner regions of ring 13. Thus, the corners where the expander 13 is bent engage the inner edges of the rings 5 and 6, and thereby urge the ring assembly outwardly. In order to permit such contact, and to obviate interference between expander 13 and the floater 9, the expander is provided with a slot 14 at each corner. The widened portions of auxiliary ring 9 extends through these slots, as shown most clearly in Figs. 3 and 4. As rings 5 and 6 wear, the clearance between ring 9 and wall 4 is reduced, and ultimately ring 9 may contact the wall 4.

Where the splits 7 occur, the projection 8 is divided by the split ring 5 into two parts 8—a and 8—b. These two parts may conveniently form an anchor for the free ends 15 and 16 of the expander ring 13. These ends are turned outwardly to engage the corners of the projections 8—a and 8—b. In this way, relative angular motion between the expander 13 and any of the rings is effectively prevented.

The inventor claims:

1. In a piston ring: a main ring adapted to be placed in a ring groove; said groove being wider than the ring; a flat auxiliary ring having substantially uniform thickness also disposed in the groove and having limited freedom of movement in a direction axial of the piston; and a plurality of angularly spaced projections carried by the main ring and extending transversely of the groove; said auxiliary ring having recesses corresponding to the projections, each of said recesses having an edge cooperating with the projections to limit movement of the auxiliary ring radially outwardly with respect to the main ring.

2. In a piston ring: a main ring adapted to rest against one side of a piston ring groove, said groove being wider than the ring; a flat auxiliary ring having substantially uniform thickness also disposed in the groove and having limited freedom of movement in a direction axial of the piston, and with respect to said main ring; and a plurality of angularly spaced projections carried by the main ring and extending transversely of the groove; said auxiliary ring having recesses corresponding to the projections, each of said recesses having an edge cooperating with the projections to limit movement of the auxiliary ring radially outwardly with respect to the main ring.

3. In a piston ring: a main ring adapted to rest against one side of a piston ring groove, said groove being wider than the ring; a flat auxiliary ring also disposed in the groove and having limited freedom of movement in a direction axial of the piston, and with respect to said main ring; and a plurality of angularly spaced projections on one of the rings and engaging in recesses in the other ring, each of said recesses having an edge cooperating with the projections for limiting outward radial movement of the auxiliary ring with respect to the main ring.

4. In a piston ring: a main ring adapted to rest against one side of a piston ring groove, said groove being wider than the ring; a second ring disposed on the other side of the groove, there being a space between said two rings; an auxiliary ring having substantially uniform thickness located in the space between the other two rings and having a thickness substantially less than the space between the other two rings; and a plurality of angularly spaced projections carried by the main ring and extending transversely of the groove; said auxiliary ring having recesses corresponding to the projections, each of said recesses having an edge cooperating with the projections to limit movement of the auxiliary ring radially outwardly with respect to the main ring.

5. In a piston ring: a main ring adapted to rest against one side of a piston ring groove, said groove being wider than the ring; a second ring disposed on the other side of the groove, there being a space between said two rings; an auxiliary ring having substantially uniform thickness located in the space between the other two rings and having a thickness substantially less than the space between the other two rings; and means, including a plurality of angularly spaced projections carried by one of the rings, and recesses in another of the rings, each of said recesses having an edge cooperating with the projections for limiting movement radially outwardly of the auxiliary ring with respect to the main ring.

6. In a piston ring: a main ring adapted to rest against one side of a piston ring groove, said groove being wider than the ring; an auxiliary ring having substantially uniform thickness also disposed in the groove and having limited freedom of movement in a direction axial of the piston, and with respect to said main ring; a plurality of angularly spaced projections carried by the main ring and extending transversely of the groove; said auxiliary ring having recesses corresponding to the projections, each of said recesses having an edge cooperating with the projections to limit movement of the auxiliary ring radially outwardly with respect to the main ring; and an expander in the groove and urging the rings outwardly.

7. In a piston ring: a main ring adapted to rest against one side of a piston ring groove, said groove being wider than the ring; an auxiliary ring having substantially uniform thickness also disposed in the groove and having limited freedom of movement in a direction axial of the piston, and with respect to said main ring; a plurality of angularly spaced projections carried by the main ring and extending transversely of the groove; said auxiliary ring having recesses corresponding to the projections, each of said recesses having an edge cooperating with the projections for limiting movement of the auxiliary ring radially outwardly with respect to the main ring; and an expander having slots into which the auxiliary ring may project, and contacting the inner edge of the main ring.

8. In a piston ring: a main ring adapted to rest against one side of a piston ring groove, said groove being wider than the ring; an auxiliary ring having substantially uniform thickness also disposed in the groove and having limited freedom of movement in a direction axial of the piston, and with respect to said main ring; a plurality of angularly spaced projections on one of the rings and engaging in recesses in the other ring, each of said recesses having an edge cooperating with the projections for limiting outward radial movement of the auxiliary ring with respect to the main ring; and an expander in the groove and urging the rings outwardly.

9. In a piston ring: a main ring adapted to rest against one side of a piston ring groove, said groove being wider than the ring; an auxiliary ring having substantially uniform thickness also disposed in the groove and having limited freedom of movement in a direction axial of the piston, and with respect to said main ring; a plurality of angularly spaced projections on one of the rings and engaging in recesses in the other ring, each of said recesses having an edge cooperating with the projections for limiting outward radial movement of the auxiliary ring with respect to the main ring; and an expander in the groove and urging the rings outwardly, said expander having slots to eliminate contact between the expander and the auxiliary ring.

10. In a piston ring: a main ring adapted to rest against one side of a piston ring groove, said groove being wider than the ring; a second ring disposed on the other side of the groove, there being a space between said two rings; an auxiliary ring having substantially uniform thickness located in the space between the other two rings and having a thickness substantially less than the space between the other two rings; a plurality of angularly spaced projections carried by the main ring and extending transversely of the groove; said auxiliary ring having recesses corresponding to the projections, each of said recesses having an edge cooperating with the projections to limit movement of the auxiliary ring radially outwardly with respect to the main ring; and an expander in the groove, said expander having slots to eliminate contact between the expander and the auxiliary ring.

11. In a piston ring: a main ring adapted to rest against one side of a piston ring groove, said groove being wider than the ring; an auxiliary ring having substantially uniform thickness also disposed in the groove and having limited freedom of movement in a direction axial of the piston, and with respect to said main ring; a plurality of angularly spaced projections on one of the rings and engaging in recesses in the other ring, each of said recesses having an edge cooperating with the projections for limiting outward radial movement of the auxiliary ring with respect to the main ring; and an expander in the groove and urging the rings outwardly; said expander having outwardly turned ends contacting a pair of projections to restrain the expander against substantial movement angularly of the axis of the piston rings.

FRED ERNST.

REFERENCES CITED

The following references are of record in the file of this patent:

UNITED STATES PATENTS

| Number | Name | Date |
| --- | --- | --- |
| 768,136 | Murphy | Aug. 23, 1904 |
| 1,707,035 | Wuerfel | Mar. 26, 1929 |
| 2,064,576 | Teetor | Dec. 15, 1936 |
| 2,233,723 | Ballard | Mar. 4, 1941 |
| 2,273,703 | Gille | Feb. 17, 1942 |
| 2,329,296 | Rentfro | Sept. 14, 1943 |
| 2,391,134 | Conrad | Dec. 18, 1945 |